(12) United States Patent
Mate et al.

(10) Patent No.: US 12,279,090 B2
(45) Date of Patent: Apr. 15, 2025

(54) PRIVACY PROTECTION IN SPATIAL AUDIO CAPTURE

(71) Applicant: Nokia Technologies OY, Espoo (FI)

(72) Inventors: Sujeet Shyamsundar Mate, Tampere (FI); Antti Johannes Eronen, Tampere (FI); Arto Juhani Lehtiniemi, Lempaala (FI); Lasse Juhani Laaksonen, Tampere (FI)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 17/768,317

(22) PCT Filed: Oct. 29, 2020

(86) PCT No.: PCT/EP2020/080392
§ 371 (c)(1),
(2) Date: Apr. 12, 2022

(87) PCT Pub. No.: WO2021/084004
PCT Pub. Date: May 6, 2021

(65) Prior Publication Data
US 2024/0107225 A1    Mar. 28, 2024

(30) Foreign Application Priority Data
Oct. 30, 2019    (FI) ...................................... 20195933

(51) Int. Cl.
*H04R 1/40* (2006.01)
(52) U.S. Cl.
CPC .................................. *H04R 1/406* (2013.01)
(58) Field of Classification Search
CPC .. H04R 1/406; G10K 11/175; G10K 11/1752; G10K 11/1754
USPC ........................................ 381/26, 56, 58, 73
See application file for complete search history.

(56) References Cited

U.S. PATENT DOCUMENTS

| | | | |
|---|---|---|---|
| 2006/0137018 A1* | 6/2006 | Herschaft | H04N 7/1675 348/E7.071 |
| 2012/0254382 A1* | 10/2012 | Watson | H04W 64/00 709/221 |
| 2015/0382124 A1 | 12/2015 | Hall et al. | |
| 2018/0199136 A1 | 7/2018 | Sculley et al. | |
| 2018/0268835 A1 | 9/2018 | Krasnov | |
| 2019/0036887 A1* | 1/2019 | Miller | G07C 9/20 |

FOREIGN PATENT DOCUMENTS

| | | | |
|---|---|---|---|
| EP | 3048608 A1 | 7/2016 | |
| WO | WO-2009/156928 A1 | 12/2009 | |

OTHER PUBLICATIONS

International Search Report for International Application No. PCT/EP2020/080392 dated Dec. 15, 2020.

* cited by examiner

*Primary Examiner* — William A Jerez Lora
(74) *Attorney, Agent, or Firm* — Harness, Dickey & Pierce, P.L.C.

(57) ABSTRACT

There is provided an apparatus comprising means for receiving spatial audio capture requirement(s) of one or more user devices; determining position and/or orientation information of the one or more user devices; generating one or more privacy masks at least partly based on the spatial audio capture requirement(s) and position and/or orientation information of the one or more user devices; and transmitting the generated privacy masks to the one or more user devices.

10 Claims, 7 Drawing Sheets

PRIVACY PROTECTION IN SPATIAL AUDIO CAPTURE

CROSS-REFERENCE TO RELATED APPLICATIONS

This application is a national phase under 35 U.S.C. § 371 of PCT International Application No. PCT/EP2020/080392 which has an International filing date of Oct. 29, 2020, which claims priority to Finnish Application No. 20195933, filed Oct. 30, 2019, the entire contents of each of which are hereby incorporated by reference.

FIELD

Various example embodiments relate to spatial audio capture and privacy protection.

BACKGROUND

When spatial audio is captured in public places, there may be challenges related to the privacy of people that are present in those public places. Thus, there is a need to protect the privacy in spatial audio capture.

SUMMARY

According to some aspects, there is provided the subject-matter of the independent claims. Some embodiments are defined in the dependent claims. The scope of protection sought for various embodiments is set out by the independent claims. The embodiments, examples and features, if any, described in this specification that do not fall under the scope of the independent claims are to be interpreted as examples useful for understanding various embodiments.

According to a first aspect, there is provided an apparatus comprising means for: receiving spatial audio capture requirement(s) of one or more user devices; determining position and/or orientation information of the one or more user devices; generating one or more privacy masks at least partly based on the spatial audio capture requirement(s) and position and/or orientation information of the one or more user devices; and transmitting the generated privacy masks to the one or more user devices.

According to an embodiment, the spatial audio capture requirement(s) is received from a plurality of user devices, and the apparatus further comprises means for determining whether a user device of the plurality of user devices is a known or unknown user device to another user device of the plurality of user devices.

According to an embodiment, the apparatus further comprises means for tracking one or more audio sources without a user device; determining, based on position information, that the one or more audio source is not in vicinity of the one or more user device or of a known device in a public space; and determining that the one or more audio sources is treated as an unknown device; or determining, based on position information, that the one or more audio source is in vicinity of an unknown device; and determining that the one or more audio sources is treated as an unknown device.

According to an embodiment, in response to determining that a user device of the plurality of user devices is an unknown user device, the action is record diffused audio, or do not record any audio, or ignore that the user device is an unknown user device in response to determining, based on position information, that the user device is in a private space.

According to an embodiment, generating one or more privacy masks comprises defining one or more spatial audio capture regions for the one or more user devices; and defining a mask operator indicating an action to be performed on the spatial audio capture region.

According to an embodiment, the apparatus further comprising means for receiving audio levels of captured audio from the one or more user devices; determining whether the audio levels fulfil pre-defined criterion; and in response to determining that the pre-defined criterion is not fulfilled, instruct the user device to modify audio capture or drop the user device from spatial audio capture.

According to a second aspect, there is provided an apparatus comprising means for: transmitting spatial audio capture requirement(s) to a privacy service; receiving one or more privacy masks; capturing audio according to the one or more privacy masks.

According to an embodiment, the apparatus is one of a plurality of user devices involved in generating a common volumetric audio scene.

According to an embodiment, the capturing according to the one or more privacy masks comprises acoustically steering a beamformer to attenuate a sound signal in a spatial audio capture region defined by the one or more privacy masks.

According to an embodiment, the apparatus further comprising means for determining audio capture level(s) in one or more spatial audio capture regions defined by the one or more privacy masks; and transmitting the audio capture level(s) to the privacy service.

According to an embodiment, the apparatus further comprising means for receiving instructions from the privacy service to modify audio capture; or dropping off from spatial audio capture.

According to an embodiment, the spatial audio capture requirement(s) comprises one or more of positions and/or properties of microphone(s) of the one or more user devices; capture policy defining an action in case of unknown user devices; and indication of whether the one or more user devices are involved in generating a common volumetric audio scene.

According to an embodiment, the one or more privacy masks define one or more spatial audio capture regions for the one or more user devices; and a mask operator indicating an action to be performed in the one or more spatial audio capture regions, wherein the action is removing directional component(s) and retaining diffuse component(s) of captured audio content; or removing any audio content; or removing diffuse component(s) and retaining directional component(s) of captured audio content.

According to an embodiment, the one or more privacy masks are locked to device orientation or to an object of interest.

According to an embodiment, the one or more privacy masks are microphone specific.

According to an embodiment, the means comprises at least one processor; and at least one memory including computer program code, the at least one memory and the computer program code configured to, with the at least one processor, cause the performance of the apparatus.

According to a third aspect, there is provided a method, comprising receiving spatial audio capture requirement(s) of one or more user devices; determining position and/or orientation information of the one or more user devices; generating one or more privacy masks at least partly based on the spatial audio capture requirement(s) and position and/or orientation information of the one or more user devices; and transmitting the generated privacy masks to the one or more user devices.

According to a fourth aspect, there is provided an optionally non-transitory computer readable medium comprising program instructions that, when executed by at least one processor, cause an apparatus to at least to perform: receiving spatial audio capture requirement(s) of one or more user devices; determining position and/or orientation information of the one or more user devices; generating one or more privacy masks at least partly based on the spatial audio capture requirement(s) and position and/or orientation information of the one or more user devices; and transmitting the generated privacy masks to the one or more user devices.

According to a fifth aspect, there is provided a method, comprising transmitting spatial audio capture requirement(s) to a privacy service; receiving one or more privacy masks; capturing audio according to the one or more privacy masks.

According to a sixth aspect, there is provided an optionally non-transitory computer readable medium comprising program instructions that, when executed by at least one processor, cause an apparatus to at least to perform: transmitting spatial audio capture requirement(s) to a privacy service; receiving one or more privacy masks; capturing audio according to the one or more privacy masks.

According to further aspects, there is provided a computer program configured to cause a method according to the third aspect or the fifth aspect to be performed.

DETAILED DESCRIPTION

Spatial audio or immersive audio or surround sound or scene-based audio refer to techniques to represent and create sound, e.g., such as to mimic the way we hear in real life. Spatial audio gives you a sense of location and orientation of sound sources which may be located anywhere in three-dimensional space, e.g. on the side, behind, above or below a listener. In addition, spatial audio may give you a sense of acoustic properties of the recording space (or a synthetic environment), such as reflections and reverberations, etc. Introduction of new high-speed wireless access to telecommunications networks, such as new radio or 5G, may increase use of immersive audio e.g. in making immersive audio calls.

A codec (coder/decoder) is a device and/or algorithm that is used typically to convert information originating from an analogue source (such as speech, image, audio or video content) into a compressed digital stream for transmission, and then provide a decoding allowing conversion back to analogue again at the receiving end. An example of a codec for immersive audio is the immersive voice and audio services (IVAS) codec. This codec encodes audio inputs that may consist of captured audio sources, e.g. all the audio sources, and ambience in the vicinity of the recording device. The IVAS codec thus converts the spatial audio input into a bitstream for transmission and converts it back into a digital spatial audio representation (that may correspond to the input audio format) or a rendering, which may be, e.g., mono, stereo, binaural, or correspond to any suitable loudspeaker configuration (e.g., 5.1 or 7.1+4). The recording device may be, e.g., a mobile device. In addition to any dominant audio sources, ambience is present, which enables the codec to provide an immersive listening experience. In immersive listening experience, acoustic properties of the recorded scene, such as the direction of arrival of talker(s) and other sounds of the environment, may be retained. In addition to managed communications services with Quality of Service (QoS), spatial audio may be captured and made available, e.g., as part of live streaming or over the top (OTT) media content. For example, the spatial audio may be pre-recorded and produced for streaming on demand.

However, in spatial audio capture, there may be challenges related to privacy. For example, a user may make an immersive audio call in a public place, such as in an exhibition, conference, restaurant, or any gathering of people. Depending on the sensitivity of the audio capture apparatus, the ambience capture may result in inclusion of private conversations of adjacent users. Thus, the privacy of the people may be jeopardized.

Figure 1:
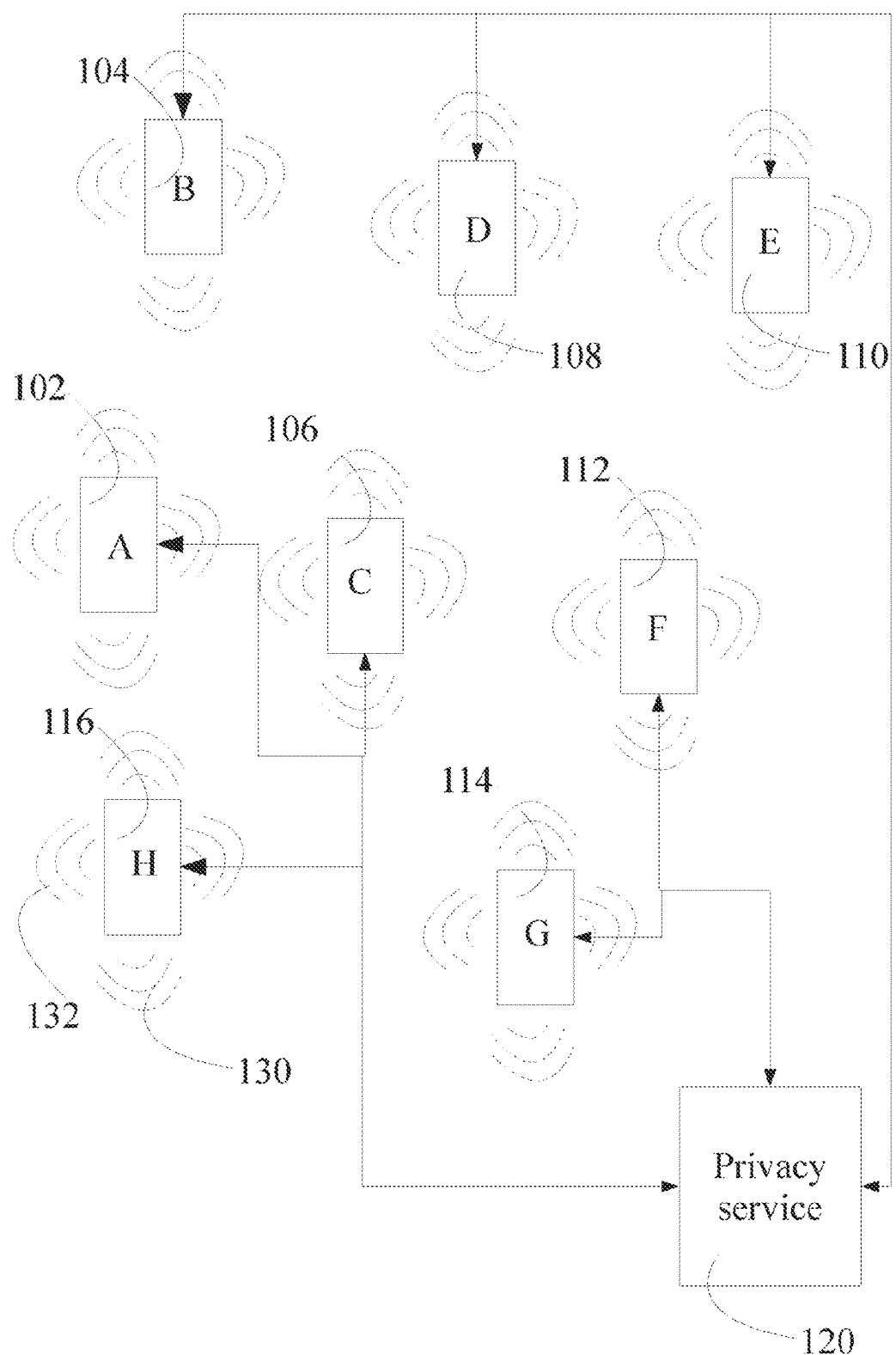
FIG. 1 shows, by way of example, a scenario of spatial audio capture.

FIG. 1 shows, by way of example, a scenario of spatial audio capture, where multiple users are present with the mobile devices capable of capturing a surrounding audio scene, i.e. capable of capturing spatial audio. Device capable of capturing spatial audio is equipped with a microphone, e.g., two or more microphones. Different types of microphones may be used, e.g. omnidirectional, bidirectional, cardioid, shotgun, etc. Multiple devices, i.e. the devices A 102, B 104, C 106, D 108, E 110, F 112, G 114, H 116, may be considered to be in proximity of each other, e.g. in a restaurant or in a conference or any gathering of people. Privacy service 120, e.g. an immersive audio privacy service (IAPS) is an orchestration service for spatial audio capture with one or more devices. The service may be utilized e.g. for point to point immersive audio telephony or multiparty immersive audio conferencing. The service may be leveraged by devices performing standalone spatial audio or spatial audio with multiple devices, e.g. for creating a volumetric audio scene. While spatial audio capture generally requires two or more microphones, also one-microphone devices may be used, e.g., to provide a distributed spatial capture, where similar privacy aspects need to be considered.

The devices A to H capture the surrounding audio scene, as illustrated by the lines 130, 132. There may be devices, or users of the devices, that know each other, and there may be devices, or users of the devices, that do not know each other, i.e. are unknown. In the example of FIG. 1, the devices A 102, B 104, C 106, D 108, E 110 and G 114 are known to each other, whereas the devices F 112 and H 116 are unknown to each other and to the devices A, B, C, D, E and G. The privacy service 120 may determine whether a user device of the plurality of user devices is a known or unknown user device to another user device of the plurality of user devices. This determination may be performed in various ways. For example, the determination may be performed using device phonebook, social media networks or other identity management services which provide indications regarding privacy constraints between individuals in the capture area. The known devices may be employees of the same company, friends or contacts connected with each other in social networks, or they may be family members. Determination may be carried out e.g. using application programming interfaces (APIs) of services such as social network services, or corporate databases. In addition, the determination may be performed based on the context of the recording device. For example, in a private space, e.g. at home, unknown devices may be considered as known devices. On the other hand, context may also be used to limit the allowance regularly provided by information not relevant for current context (e.g., phonebook, etc.). For example, at an industrial site, all devices may be considered unknown to any other device. Also asymmetric knowledge of the devices may be introduced. For example, it may be defined that, e.g., visitors' devices at the industrial site are known devices to security staff devices. Thus, the device A (security staff device) may know the device B (visitor), but the device B does not know the device A, i.e., the device A is an unknown device to device B. Context of the recording device may be determined, e.g., based on mobile phone tracking, or based on user input.

The privacy service may determine position and/or orientation information of the user devices, e.g. using a suitable tracking service. Tracking may be based on, e.g., 5G based positioning, GPS and/or indoor positioning, such as WiFi based positioning. For example, networks, such as 5G networks, may provide high quality location awareness and position tracking of the mobile devices. This information may be combined with inertial sensors of the mobile devices. This way, low latency networks enable accurate and real-time tracking capability for the user devices. The privacy service may leverage such services to determine the device positions and/or orientations. Position and/or orientation information may comprise the positions and/or orientations of the user devices with respect to the other user devices. Position information may comprise location, or context, of the user devices. For example, it may be determined based on the position information whether the user device is in a public space or in a private space.

The privacy service may track audio sources without a user device. Without a user device here may mean that the audio source, e.g. a person, may have some user devices, but does not carry a user device that enables position tracking as described above, e.g. based on GPS and/or indoor positioning. Persons may be tracked to determine the potential of audio sources which may need to be monitored in order to protect their privacy. In case there are audio sources without a user device, the position and/or orientation information may comprise the positions and/or orientations of the user devices with respect to these audio sources. Tracking of audio sources may be performed, e.g., based on audio analysis or based on person tracking systems such as closed-circuit television (CCTV) cameras.

Audio sources without a user device may be treated as known or unknown, depending, e.g., on the context or user preference. In private space, for example, audio sources without a user device may be treated as a known device. This means that there are no restrictions for recording performed by the device(s) in the same space. In public space, audio sources without a user device but located in the vicinity of an unknown device which is part of the privacy service, e.g., registered to the service, may be treated as unknown. An action defined for the unknown device part of the service may indicate that "do not record audio signals from the audio source without a user device". If an audio source without a user device is located in the vicinity of a known device in a public space, the audio source without a user device may be treated as a known source, or a known device. Audio sources without a user device and without any devices, known or unknown, in the vicinity, may be treated based on user preference. In the vicinity here may be defined as within a pre-defined distance from a device. A threshold may be defined for the distance. There may be more than one threshold distance values, and they may be different on a device-by-device basis. For example, the threshold distance may be based on device capability such as audio capture in terms of signal-to-noise ratio (SNR) and/or beamforming.

Figure 2:
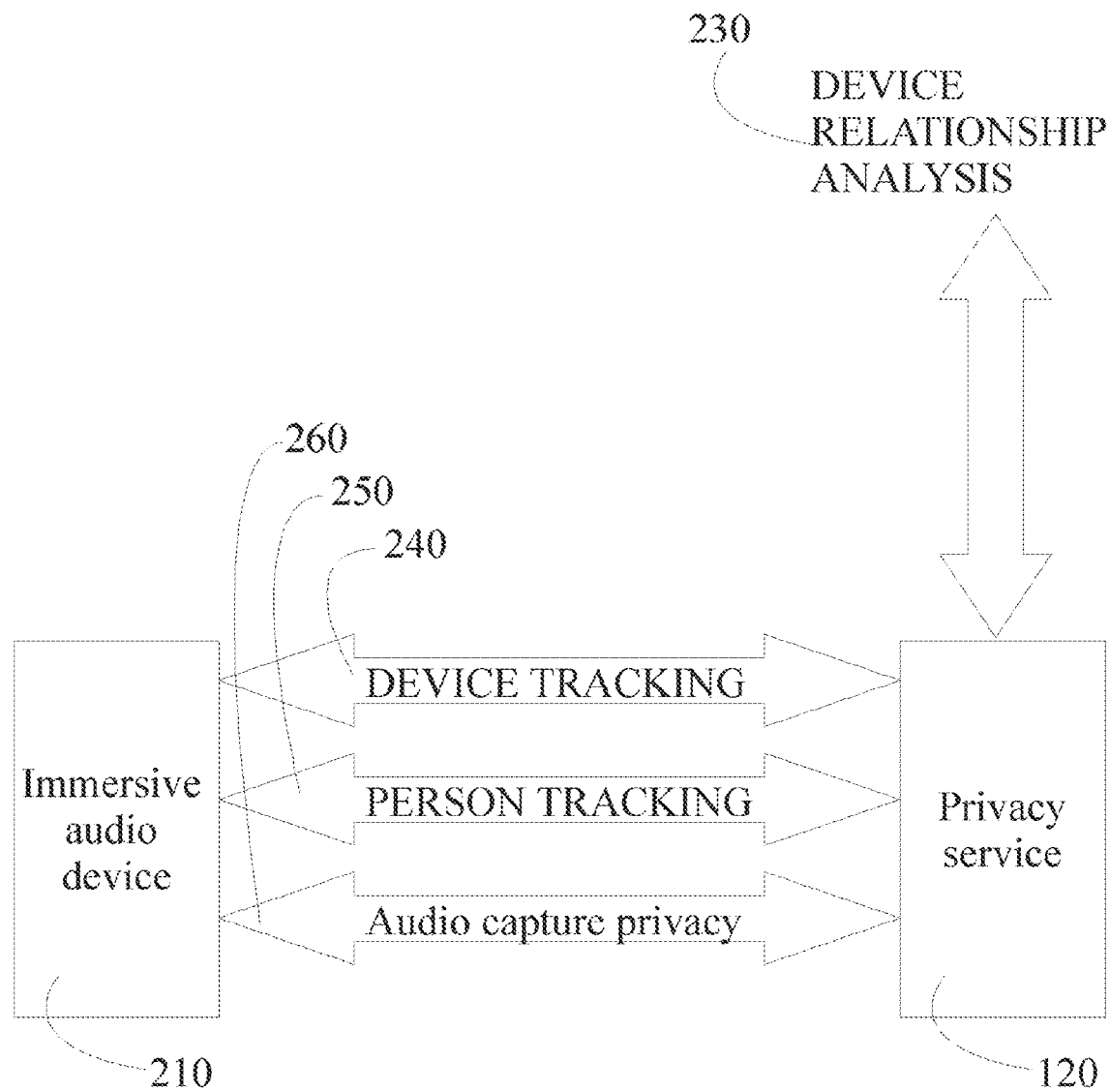
FIG. 2 shows, by way of example, implementation of a service stack of a privacy service.

FIG. 2 shows, by way of example, implementation of a service stack of the privacy service 120, e.g., IAPS. Immersive audio device 210 is the entity referring to the user device capable of capturing spatial audio, e.g., the LAPS client. The user device may be a mobile communication device. Device relationship analysis 230, i.e., determination of known versus unknown described above, device tracking 240, i.e., determination of the device positions and/or orientations described above, and person tracking 250, i.e., tracking of audio sources without a user device described above, may be so called enablers utilized by the privacy service. Any suitable tracking may be employed in device tracking 240 and person tracking 250. Any suitable device relationship analysis services may be employed in device relationship analysis 230. The person tracking 250 may be an optional component, since most people nowadays carry a mobile communication device. The combined enablers may be selected based on the implementation and deployment. The audio capture privacy 260 refers to the method(s) disclosed herein.

There is provided method(s), and one or more apparatuses performing the method(s), for protecting the privacy of users when performing spatial audio capture.

Figure 3:
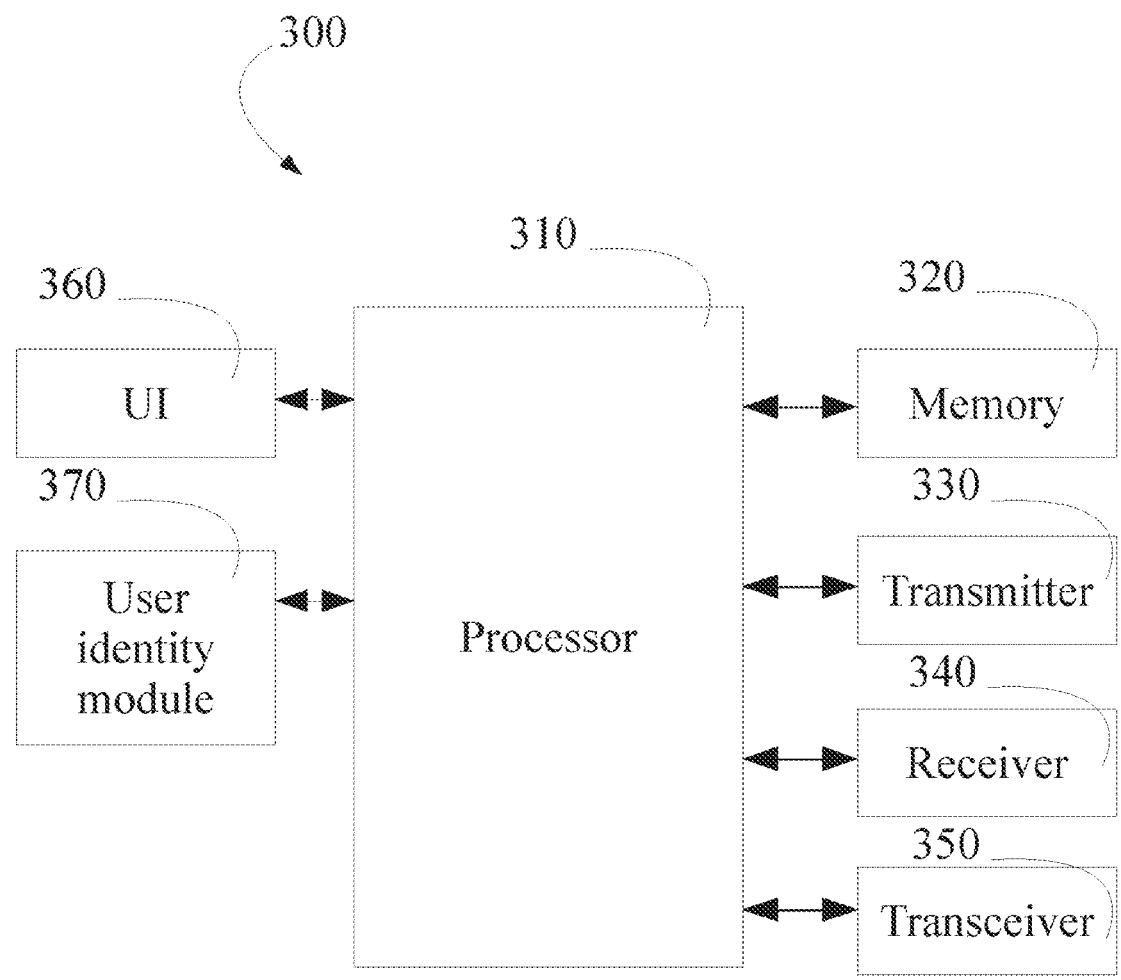
FIG. 3 shows, by way of example, a block diagram of an apparatus.

FIG. 3 shows, by way of example, a block diagram of an apparatus. Illustrated is device 300, which may comprise, for example, a user device, such as a mobile communication device 102, 104, 106, 108, 110, 112, 114 or 116 of FIG. 1 or the immersive audio device 210 of FIG. 2. Alternatively, the device 300 may comprise the privacy service 120 of FIG. 1 and FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies)

that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and one or more microphones. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370, e.g., a universal integrated circuit card, UICC, or an embedded universal integrated circuit card, eUICC. User identity module 370 may comprise, for example, a subscriber identity module, SIM. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected.

Figure 4A:
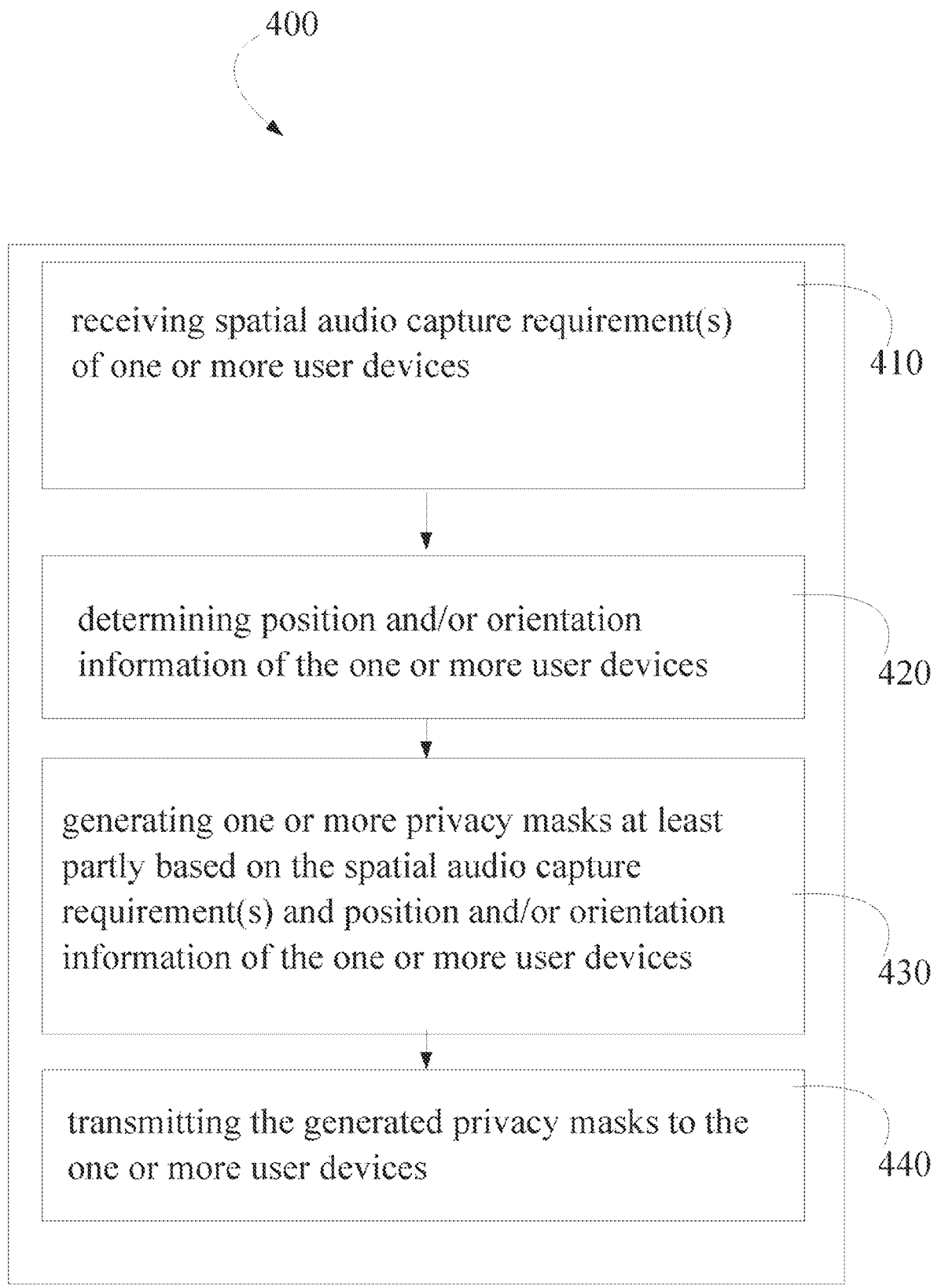
FIG. 4a shows, by way of example, a flowchart of a method for privacy protection in spatial audio capture.

FIG. 4*a* shows, by way of example, a flowchart of a method 400 for privacy protection in spatial audio capture. The method may be performed, e.g., by the privacy service. The method may be for assigning spatial audio capture regions for user devices, e.g., spatial audio capture devices, e.g., mobile devices capable of capturing spatial audio. The method 400 comprises receiving 410 spatial audio capture requirement(s) of one or more user devices. The method 400 comprises determining 420 position and/or orientation information of the one or more user devices. The method 400 comprises generating 430 one or more privacy masks at least partly based on the spatial audio capture requirement(s) and position and/or orientation information of the one or more user devices. The method 400 comprises transmitting 440 the generated privacy masks to the one or more user devices.

Figure 4B:
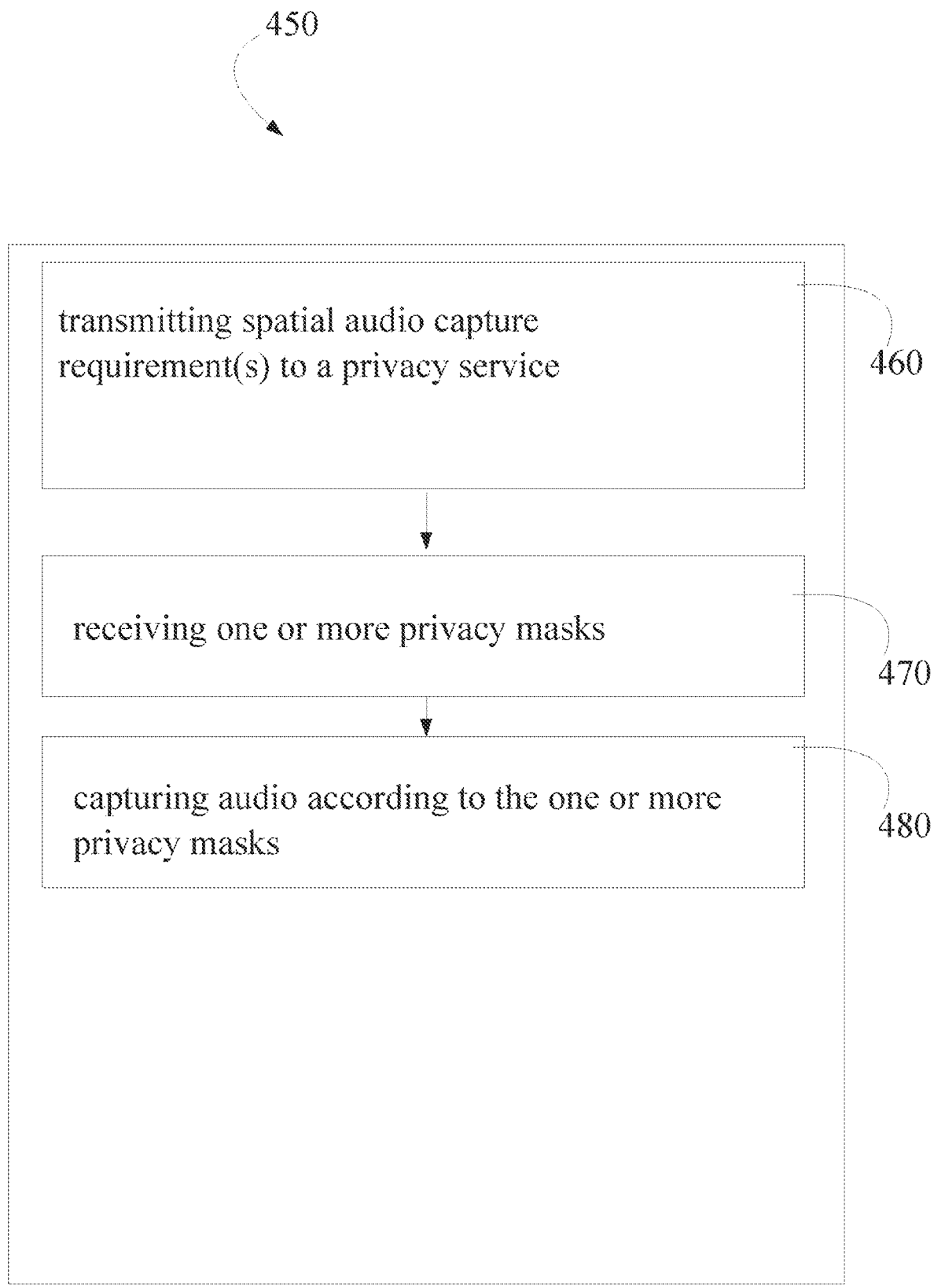
FIG. 4b shows, by way of example, a flowchart of a method for privacy protection in spatial audio capture.

FIG. 4*b* shows, by way of example, a flowchart of a method 450 for privacy protection in spatial audio capture. The method may be performed, e.g., by the user device. The user device may be a spatial audio capture device, e.g. a mobile device capable of capturing spatial audio. The method 450 comprises transmitting 460 spatial audio capture requirement(s) to a privacy service. The method 450 comprises receiving 470 one or more privacy masks. The method 450 comprises capturing 480 audio according to the one or more privacy masks.

These methods enable the protection of privacy when capturing spatial audio. These methods enable privacy protection also in situations where there is a group of users with spatial capture microphones which are collocated, e.g., for creating volumetric audio content, and in addition there are users with spatial capture microphone(s) not part of the capture. The methods disclosed herein enable privacy protection of also those users that are not part of the spatial audio capture while still enabling volumetric capture of the space.

Figure 5:
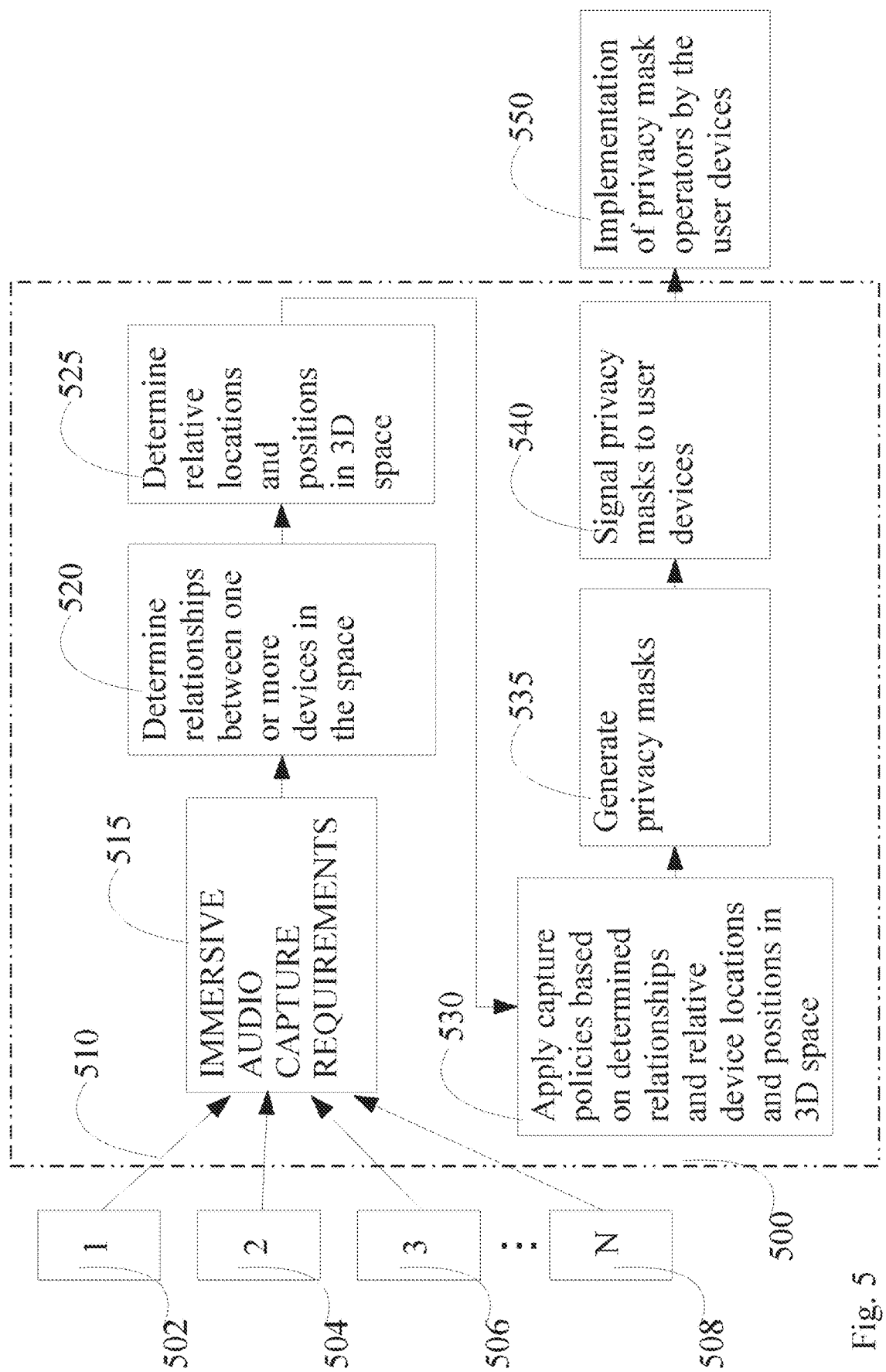
FIG. 5 shows, by way of example signalling between privacy service and user device(s)

FIG. 5 shows, by way of example, signalling between the privacy service 500, e.g. the LAPS, and the user device(s) 502, 504, 506, 508, e.g. the immersive audio capture device(s). The service, e.g., the IAPS, may work as a client-server architecture. The user devices, or LAPS clients, that may be expected to perform immersive audio capture, may transmit 510 capture requirements 515 to the service. Immersive audio capture may comprise capturing audio from close up audio sources as well as other spatial content such as ambience in the audio scene.

One or more user devices 502, 504, 506, 508, i.e., the devices, 1, 2, 3, . . . , N, may transmit spatial audio capture requirements to the privacy service. Capture requirements may comprise, e.g., device information, policy for capture if there are unknown devices in the vicinity, and/or indication of whether the device is part of joint capture by forming a group with other devices in the vicinity.

The device information may comprise, e.g., positions and/or properties of microphone(s) of the one or more user devices. The device information may comprise device identifiers.

The signalling between the privacy service and the user device(s) may be described in a data structure which may be signalled e.g. over hypertext transfer protocol or session initiation protocol (HTTP/SIP). The data may be in a suitable representation format, e.g., XML, JSON or binary.

An example of the data structure signalled 510 from the user device(s) 502, 504, 506, 508 to the privacy service 500 may be as follows:

```
aligned(8) CaptureApparatusStruct( ) {
    unsigned int(8) num_microphones;
    for (i = 0; i < num_microphones; i++)
        SingleMicrophoneStruct( );
    for (j = 0; j < num_beams; j++)
        SingleBeamStruct( );
    unsigned int(4) unknown_device_action;
    unsigned int(32) joint_capture_id;
    bit (4) reserved = 0;
}
aligned(8) class SingleMicrophoneStruct( ) {
    signed int(32) centre_azimuth;
    signed int(32) centre_elevation;
    unsigned int(4) microphone_type;
    unsigned int(1) coordinate_type;
    bit (3) reserved = 0;
}
aligned(8) SingleBeamStruct( ) {
    signed int(32) centre_azimuth;
    signed int(32) centre_elevation;
    signed int(32) centre_tilt;
    unsigned int(32) azimuth_range;
    unsigned int(32) elevation_range;
    unsigned int(32) attenuation_gain;
}
``` wherein the variable num_microphones indicates the number of microphones in a user device, e.g., a spatial audio capture device. The number of the microphones may be one or more.

The variable unknown_device_action in the data structure may define a policy for capture if there are unknown devices in the vicinity. The unknown_device_action indicates actions recommended for the privacy service. A different action may be specified for different microphones of a same user device, i.e., the action may be microphone specific. For example, a user device may comprise multiple shotgun microphones. The privacy service may decide to mask audio in a certain direction whereas allowing the presence of audio from another direction. The action may be defined e.g. using following correspondences:

Unknown_device_action: 0—Action: do not care
Unknown_device_action: 1—Action: record diffused audio
Unknown_device_action: 2—Action: Do not record any audio
Unknown_device_action: 3—Action: Reserved For example, a particular user may choose no recording for any content which has risk of incorporating content from an unknown source.

The unknown_device_action may depend on the context of the user device. For example, if the unknown device, or an audio source without a user device, is in a private space, e.g., at someone's home, the action may be "do not care". This means that it may be ignored that the device is unknown, i.e., the device may be treated as a known device which causes no restrictions to the recordings. As another example, unknown device, or an audio source without a user device, in vicinity of a known device in a public space may be treated as a known source, i.e., the action may be "do not care".

The variable joint_capture_id refers to a group of user devices, e.g. audio capture devices. The group may comprise, e.g., one or more devices. Each of the devices creating a common immersive audio content may have the same value for joint_capture_id. For example, there may be three devices of which two devices form one group, e.g., a first group, and one device form another group, e.g., a second group. The group device audio of the first group is not used with the second group.

The variable centre_azimuth indicates the orientation of the microphone in horizontal direction relative to the audio capture device. The plane corresponding to the device display is the horizontal plane. In other words, the plane which is parallel with the surface of the device display is the horizontal plane.

The variable center_elevation indicates the orientation of the microphone in the vertical direction relative to the audio capture device. The plane perpendicular to the device display is the vertical plane. In other words, the plane which is perpendicular to the surface of the device display is the vertical plane.

The above may assume that the centre of the device is the origin of the unit sphere enveloping the user device, e.g. audio capture device.

The variable microphone type indicates the type of microphone describing the directional characteristics of the microphone, i.e., polar patterns of the microphone. For example, the following correspondences may be defined:

microphone_type: 0—Type: Omnidirectional
microphone_type: 1—Type: Subcardioid
microphone_type: 2—Type: Shotgun
microphone_type: 3-15—Type: Reserved The variable SingleBeamStruct( ) indicates audio beamforming capability of the device. The audio beamforming capability indicates the capability to enable exclusion of certain regions and inclusion of the other regions. The regions may be specified by the service response described later. This information on audio beamforming capability may be determined based on the microphone characteristics and provided by the device manufacturer.

The variable attenuation gain indicates the capability of the device to attenuate sound signal in the specified regions around the capture device. This information is determined based on the microphone characteristics and provided by the device manufacturer.

Relationships between devices in the space where the devices are located may be determined 520. The space may be, e.g., the place, where a user makes an immersive audio call. The place may be, e.g., a public place, such as an exhibition, conference, restaurant, or any gathering of people. It may be determined whether a user device of the plurality of user devices is a known or unknown user device to another user device of the plurality of user devices. This determination may be performed in various ways. For example, the determination may be performed using device phonebook, social media networks or other identity management services which provide indications regarding privacy constraints between individuals in the capture area. The known devices may be employees of the same company, friends or contacts connected with each other in social networks, or they may be family members. Determination may be carried out, e.g., using application programming interfaces (APIs) of services such as social network services, or corporate databases.

Relative locations and/or positions of the one or more user devices in 3D space may be determined 525. Determination may be performed by the privacy service, e.g., using a suitable tracking service. For example, networks, such as 5G networks, may provide high quality location awareness and position tracking of the mobile devices. This information may be combined with inertial sensors of the mobile devices. This way, low latency networks enable accurate and real-time tracking capability for the user devices. The privacy service may leverage such services to determine the device positions and/or orientations. It may be determined, based on the device positions and/or orientations, which devices are the nearby devices, and/or what is the location and/or orientation of the user's own device with respect to the other devices.

Capture policies may be applied 530 by the privacy service based on determined relationships and relative locations and/or positions of the one or more user devices in 3D space. For example, the privacy service may have received capture policy from the one or more user devices. The capture policy may define actions in case of unknown user devices, e.g. as defined by the variable unkwnon_device_action described above. The action may be microphone specific, i.e., a different action may be specified for different microphones of a same user device. The action may be, e.g., record diffused audio, do not record any audio or ignore that the user device is an unknown user device.

One or more privacy masks may be generated 535 by the privacy service. The generation of the privacy masks may be performed at least partly based on the spatial audio capture requirement(s). Generation of the privacy masks may be further based on the determined relationships and/or relative locations and/or positions of the devices.

Generating a privacy masks may comprise defining one or more spatial audio capture regions for the one or more user devices, and defining a mask operator for the spatial audio capture region. The mask operator indicates an action to be performed in the spatial audio capture region. The spatial region masks may comprise actions such as attenuation of content captured in specified regions, highlighting of content captured in specified regions, and/or creating a diffused version of the audio content in specified regions. The action may be dependent on the capture policy in case of unknown devices.

The service response comprising privacy masks may be signalled 540 by the privacy service 500 to the one or more user devices 502, 504, 506, 508. The user devices, or a subset of the user devices, may be involved in generating a volumetric audio scene. A subset may be one or more user devices. The privacy masks may be applied to multiple user devices, e.g., spatial audio capture devices, simultaneously. An example of a data structure may be as follows:

```
aligned(8) SinglePrivacyMaskStruct( ) {
    signed int(32) centre_azimuth;
    signed int(32) centre_elevation;
    signed int(32) centre_tilt;
    unsigned int(32) azimuth_range;
    unsigned int(32) elevation_range;
    unsigned int(1) world_locked;
    unsigned int(4) capture_mask_operator;
    bit (3) reserved = 0;
}
aligned(8) class PrivacyMaskStruct( ) {
    unsigned int(16) num_privacy_mask_regions;
    for (i = 0; i < num_privacy_mask_regions; i++)
        SinglePrivacyMaskStruct( );
}
``` wherein the variable centre_azimuth indicates the orientation of the microphone in horizontal direction relative to the audio capture device. The plane corresponding to the device display is the horizontal plane. In other words, the plane which is parallel with the surface of the device display is the horizontal plane.

The variable center_elevation indicates the orientation of the microphone in the vertical direction relative to the audio capture device. The plane perpendicular to the device display is the vertical plane. In other words, the plane which is perpendicular to the surface of the device display is the vertical plane.

The variable azimuth_range indicates the length of the spatial audio capture region in the horizontal direction if projected on a unit sphere encompassing the capture device.

The variable elevation_range is the length of the spatial audio capture region in the vertical direction if projected on a unit sphere encompassing the capture device.

The above may assume that the centre of the device is the origin of the unit sphere enveloping the user device, e.g., audio capture device.

The spatial audio capture region indicates the audio content region over which a specified operator, the mask operator, is applied. The variable capture_mask_operator indicates the operator and a corresponding action to be performed on the specified region. For example, the following correspondences may be defined:

capture_mask_operator: 0—Action: Acoustically transparent, i.e., no change capture_mask_operator: 1—Action: Remove directional component(s) and retain diffuse component(s)

capture_mask_operator: 2—Action: Remove any audio content corresponding to the region capture_mask_operator: 3—Action: Remove diffuse component(s) and retain directional component(s)
capture_mask_operator: 4-15—Action: Reserved The perception of the sound scenes may be considered as a combination of the foreground sound and background sound. The foreground sound is referred to as a primary or direct component. The background sound is referred to as an ambient or diffuse component. The direct components may originate from point-like directional sound sources. The diffuse components may be made up of diffuse environmental sound, e.g., the reverberation, applause, or nature sound like waterfall.

The variable world_locked indicates is the privacy mask locked to an object of interest or to device orientation. For example, a value of 1 may indicate that the region is locked to the same position in the 6 degrees of freedom space. This means that the privacy mask is locked to an object of interest. If the device moves in the space, different part of the audio content relative to the device position may be impacted. A value of 0 may indicate that the specified capture mask region is relative to the device, i.e., the privacy mask is locked to device orientation.

There may be multiple PrivacyMaskStruct ( ) data structures signalled to devices, e.g. to each device, to indicate the immersive audio capture requirements or instructions. Multiple PrivaceMaskStruct ( ) data structures may be signalled to one device, such that there are different data structures for different microphones of one device.

The user device receives the privacy mask(s) and may implement 550 the privacy mask operators, i.e., may capture audio according to the one or more privacy masks. Capturing audio according to the one or more privacy masks may comprise removing directional component(s), e.g., in a certain direction such as a 2D/3D sector, and retaining diffuse component(s) of captured audio content or removing any audio content or removing diffuse component(s) and retaining directional component(s), e.g., in a certain direction such as a 2D/3D sector, of captured audio content. The direction(s) may be defined in the privacy mask data structure, e.g., by the variables centre_azimuth, center_elevation, azimuth_range, and elevation_range.

The implementation of the indications delivered by the privacy service may be implementation specific. For example, different devices may choose to implement all or part of the instructions with the audio processing algorithm implementations of their choice. For example, the device may acoustically steer a beamformer to attenuate a sound signal, or a part of it. Spatial audio capture comprising sound signals or audio signals may be separated into direct and diffuse soundfields. There are various ways to carry out the separation of soundfields. For example, let us consider a microphone producing N signals $Y_i(z)=H_i(z)X(z)$, i=1 ..., N, where $X(z)$ is the source signal and $H_i(z)$ is the impulse response between the source and the i-th microphone. Each impulse response $H_i(z)$ may be represented as $H_i(z)=H_{i,d}(z)+H_{i,r}(z)$, where $H_{i,d}(z)$ and $H_{i,r}(z)$ are its direct and reverberant component, respectively. Direct and diffuse components $Y_{i,d}(z)=H_{i,d}(z)X(z)$ and $Y_{i,r}(z)=H_{i,r}(z)X(z)$, respectively, of all microphone signals $Y_i(z)$, are recovered, given these signals and impulse responses $H_i(z)$. $X(x)$ may be recovered from signals $Y_i(z)$ and then filters $H_{i,d}$ and $H_{i,r}(z)$ may be applied to obtain $Y_{i,d}(z)$ and $Y_{i,r}(z)$, respectively. Components $H_{i,d}(z)$ and $H_{i,r}(z)$ may be obtained from $H_i(z)$ in several ways. For example, $H_{i,d}(z)$ may be taken to be a given number of the first impulses of $H_i(z)$, the initial part of $H_i(z)$ in a given time interval, or extracting $H_{i,d}(z)$ from $H_i(z)$ manually. When $H_{i,d}(z)$ is obtained, $H_{i,r}(z)$ is the remaining component of $H_i(z)$, $H_{i,r}(z)=H_i(z)-H_{i,d}(z)$. $X(z)$ may be recovered from $Y_i(z)$, i=1, ..., $Y_N(z)$, given $H_i(z)$, i=1, ..., N. There exist stable filters $G_i(z)$, i=1, ..., N such that
$\Sigma_{i=1}^{N} G_i(z)H_i(z)=1$. Hence, $X(z)$ may be reconstructed as $X(z)=\Sigma_{i=1}^{N} G_i(z)Y_i(z)$. The filters $G_i(z)$ may be given by $$G_i(z) = \frac{H_i(z^{-1})}{\sum_{i=1}^{N} H_i(z)H_i(z^{-1})}.$$

$X(z)$ may be reconstructed using finite impulse response (FIR) filters $F_i(z)$ which may be found by solving the system
$\Sigma_{i=1}^{N} F_i(z)H_i(z)=1$. Finding a set of FIR filters which satisfy this equation amounts to solving a system of linear equations for the coefficients of the unknown filters. Another way to reconstruct $X(z)$ may be using FIR approximations of filters $G(z)$. Filters $G_i(z)$ given by the formula above are infinite impulse response (IIR) filters. IIR filter may be given as $1/D(z)$, $D(z)=\Sigma_{i=1}^{N} H_i(z)H_i(z^{-1})$. Discrete Fourier transform (DFT) of corresponding functions $H_i(z-1)$ may be divided by the DFT of $D(z)$ and the inverse DFT of the result may be found to obtain FIR approximations to $G(z)$.

The signalling between the user devices and the privacy service, and possibly also with the enablers, i.e., the device tracking service, device relationship analysis service, and/or person tracking service may be a continuous process. Thus, concurrency with the change related to the user of the service and/or the change in the audio capture environment may be maintained. An example of a change is movement of other service users in the vicinity. Another example of a change is that the users in the space that were previously unknown, get to know each other. This change in the relationship between the users may be saved to a service, e.g., to a social network or other identity management service. Then, the privacy service may receive the updated relationship information and update the determination of whether the user devices are known or unknown to each other.

After receiving privacy masks from the privacy service, the clients, i.e. the user devices, capture audio according to the privacy masks. The clients may determine the actual audio level in different sectors, or the regions defined by the privacy masks. Determination of the audio levels may be performed, e.g., by measuring the sound levels using the microphone(s) of the user device, and/or a decibel meter application installed in the user device. Then, the clients may signal, or transmit, the determined actual audio level in different sectors to the privacy service. This information will enable the privacy service to have inference on the success of achieving the intended privacy. Thus, the privacy service may adapt based on the feedback received from the user devices. For example, the privacy service may instruct the user to modify audio capture or drop the user device from spatial audio capture.

The privacy service may notify the user devices if the desired privacy requirements are not being fulfilled. For example, if there are reported audio scene levels in no-audio capture zones or regions, or if the determined audio level in a sector shows strong audio level even after applying attenuation, the privacy service may determine that the conversation has not been private. This may be signalled to the user devices to inform that the attenuation was not sufficient. The determined or measured audio levels may be compared to pre-defined thresholds to determine whether the audio levels are e.g. enough attenuated.

The client may receive a message informing that the attenuation was not sufficient. In response to that information, the client may increase attenuation in the sector, or region, in question. Alternatively, the privacy service may decide to drop the non-compliant device(s) from audio capture, e.g., from multi-device spatial audio capture, or joint capture.

Figure 6:
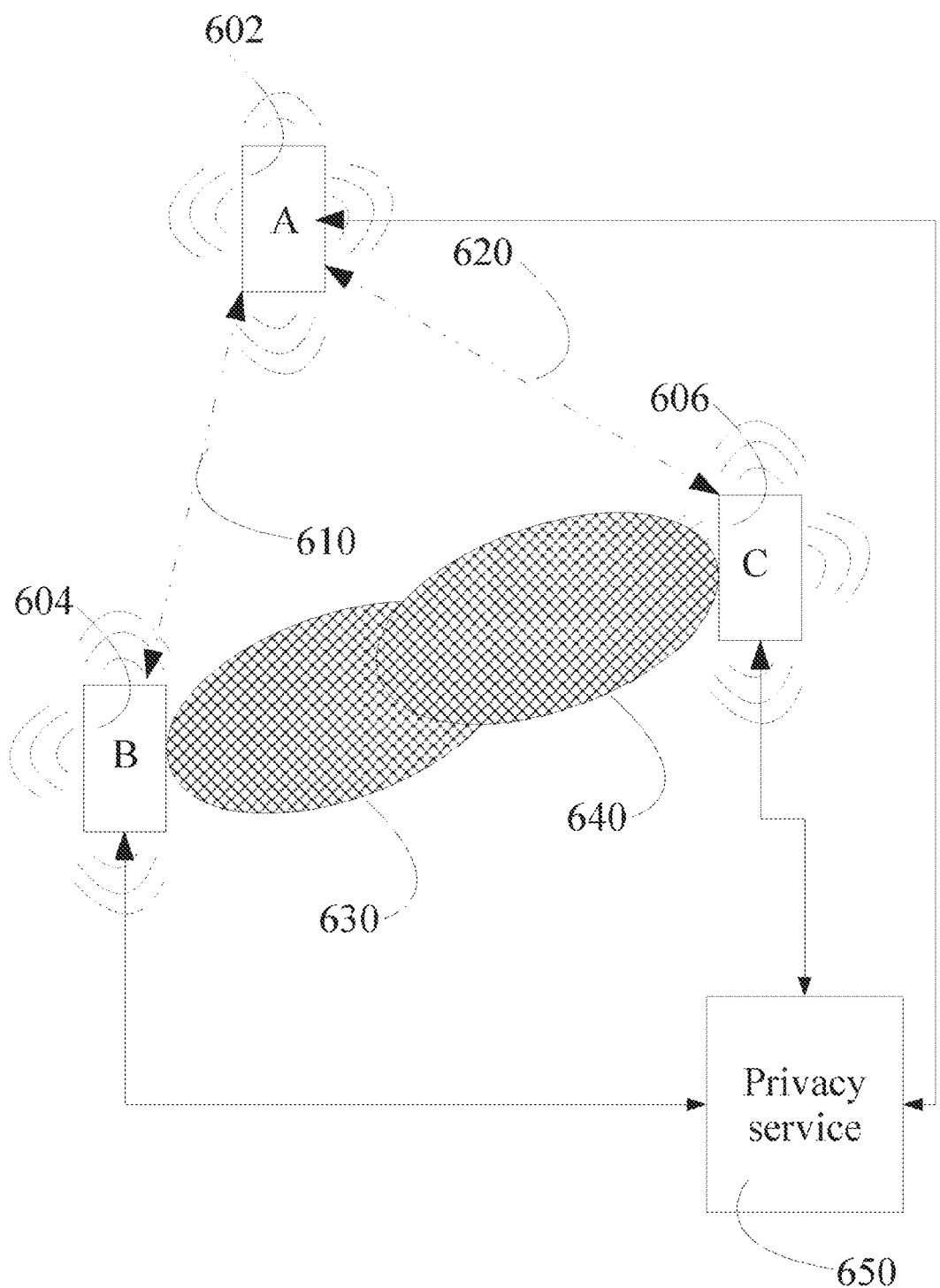
FIG. 6 shows, by way of example, a scenario, wherein a plurality of user devices is involved in capturing a volumetric audio scene.

FIG. 6 shows, by way of example, a scenario, wherein a plurality of user devices 602, 604, 606 contribute to a common scene, i.e. are involved in capturing a volumetric audio scene. Multiple versions of audio content may be generated so that the privacy requirements of each of the devices are preserved. For example, the devices A 602, B 604 and C 606 are involved in generating a common volumetric audio scene in a space, e.g., in a room, e.g., at the birthday party or any gathering of people. However, the devices B 604 and C 606, or users of the devices B and C, are mutually unknown. The devices A and B are known to each other which is illustrated by an arrow 610. The devices A and C are known to each other which is illustrated by an arrow 620. Thus, using the method(s) disclosed herein, i.e. with help of the privacy service 650, three volumetric audio content versions may be generated. The device A does not receive privacy masks attributed to the device B or C. The device B may receive privacy mask(s) 630 attributed to the device C. Thus, the device B may capture audio such that the audio from a region wherein the device C resides is e.g. attenuated or no audio is captured from that region. The device C may receive privacy mask(s) 640 attributed to the device B. Thus, the device C may capture audio such that the audio from a region wherein the device B resides is, e.g., attenuated or no audio is captured from that region.

In a further example scenario, a user makes an immersive phone call with one's user device. The user device may be, e.g., a mobile device. The mobile device may have spatial call capability, e.g., 3GPP call capability. Suitable codec, e.g., the immersive voice and audio services (IVAS) codec may be used when making the immersive phone call. The user device may communicate with the privacy service, e.g., an immersive content privacy service (ICPS). The user device may signal the capture requirements to the privacy service. The privacy service may determine the relationships between the mobile devices in the vicinity. In addition, the user's own phone location and/or orientation may be tracked by the privacy service. The privacy service may determine which devices are friends of the user, or known to the user, and which devices are unknown to the user. The privacy service may generate the privacy masks, and signal the privacy masks to the mobile device(s) subscribed to the service. The privacy masks indicate the regions and/or directions with respect to the user device, i.e., the recording device or spatial audio capture device, in which regions and/or directions the spatial audio content needs to be acoustically cancelled. The user device may steer a beamformer null to cancel those spatial regions or sectors from the spatial phone call so that the voice of unknown users is not captured in the immersive phone call.

The invention claimed is:

1. An apparatus comprising:
   at least one processor; and
   at least one memory including computer program code;
   the at least one memory and the computer program code configured to, with the at least one processor, cause the apparatus at least to receive spatial audio capture requirement(s) of one or more user devices;
   determine position and/or orientation information of the one or more user devices;
   generate one or more privacy masks at least partly based on the spatial audio capture requirement(s) and position and/or orientation information of the one or more user devices; and
   transmit the generated privacy masks to the one or more user devices.

2. The apparatus of claim 1, wherein the spatial audio capture requirement(s) is received from a plurality of user devices, and the apparatus is further configured to determine whether a user device of the plurality of user devices is a known or unknown user device to another user device of the plurality of user devices.

3. The apparatus of claim 2, wherein the apparatus is configured to determine whether the user device of the plurality of user devices is a known or unknown user device to another user device of the plurality of user devices based on at least one of the following:
   device phonebook, social media networks or other identity management services; or
   context of the user device, wherein the context is determined based on at least one of the following: location of the user device, or user input.

4. The apparatus of claim 1, wherein the apparatus is further configured to:
   track at least one audio source without a user device; and
   in response to determining, based on position information, that the at least one audio source is not in vicinity of the one or more user devices or of a known device in a public space, determine that the at least one audio source is treated as an unknown device, or
   in response to determining, based on position information, that the at least one audio source is in vicinity of an unknown device, determine that the at least one audio source is treated as an unknown device.

5. The apparatus of claim 1, wherein the generating the one or more privacy masks comprises:
   defining one or more spatial audio capture regions for the one or more user devices; and
   defining a mask operator indicating an action to be performed on the spatial audio capture region.

6. The apparatus of claim 5, wherein in response to determining that a user device of a plurality of user devices is an unknown user device, the action is one of:
   record diffused audio;
   do not record any audio; or
   ignore that the user device is an unknown user device in response to determining, based on position information, that the user device is in a private space.

7. The apparatus of claim 1, wherein the spatial audio capture requirement(s) comprises at least one of:
   positions and/or properties of microphone(s) of the one or more user devices;
   a capture policy defining an action in case of unknown user devices; or
   an indication of whether the one or more user devices are involved in generating a common volumetric audio scene.

8. The apparatus of claim 1, wherein the one or more privacy masks define:
   one or more spatial audio capture regions for the one or more user devices; and a mask operator indicating an action to be performed in the one or more spatial audio capture regions, wherein the action is one of remove directional component(s) and retaining diffuse component(s) of captured audio content, removing any audio content, or removing diffuse component(s) and retaining directional component(s) of captured audio content.

9. The apparatus of claim 1, wherein the one or more privacy masks are locked to device orientation or to an object of interest.

10. The apparatus of claim 1, wherein the apparatus is a user device.

* * * * *